(12) United States Patent  (10) Patent No.: US 7,641,068 B2
Immel et al.  (45) Date of Patent: Jan. 5, 2010

(54) LIQUID HYDROGEN STORAGE TANK WITH COMMON-ACCESS TUBE AS PORT FOR PIPES INTO THE INNER VESSEL

(75) Inventors: Rainer Immel, Dexheim (DE); Jader Matos Da Silva, Mainz (DE)

(73) Assignee: GM Global Technology Operations, Inc.

( * ) Notice: Subject to any disclaimer, the term of this patent is extended or adjusted under 35 U.S.C. 154(b) by 624 days.

(21) Appl. No.: 11/235,031

(22) Filed: Sep. 26, 2005

(65) Prior Publication Data

US 2007/0228048 A1 Oct. 4, 2007

(51) Int. Cl.
  F17C 1/00 (2006.01)
  F17C 3/00 (2006.01)
  F17C 13/00 (2006.01)
(52) U.S. Cl. .............................. 220/560.1; 220/560.12; 220/560.14
(58) Field of Classification Search ............ 220/560.09, 220/560.12, 560.1, 560.03, 560.04, 560.05, 220/560.06, 560.07, 560.08, 560.13, 560.15
See application file for complete search history.

(56) References Cited

U.S. PATENT DOCUMENTS

| | | | |
|---|---|---|---|
| 2,959,928 A | 11/1960 | Maker | |
| 3,155,265 A | 11/1964 | Reese et al. | |
| 3,156,100 A | 11/1964 | Haettinger et al. | |
| 3,309,884 A | 3/1967 | Pauliukonis | |
| 3,364,688 A | 1/1968 | Matlow et al. | |
| 3,441,164 A * | 4/1969 | Wang | 220/560.1 |
| 3,698,200 A | 10/1972 | Johnson et al. | |
| 3,905,508 A | 9/1975 | Hibl et al. | |
| 4,918,927 A | 4/1990 | Eigenbrod | |
| 5,012,948 A | 5/1991 | Van Den Bergh | |
| 5,130,193 A | 7/1992 | Ikeda | |
| 5,651,473 A | 7/1997 | Preston et al. | |
| 5,651,474 A | 7/1997 | Callaghan et al. | |
| 6,634,519 B2 * | 10/2003 | Pelloux-Gervais et al. | 220/560.1 |
| 7,293,418 B2 * | 11/2007 | Noble et al. | 62/50.6 |
| 2004/0195246 A1 | 10/2004 | Immel et al. | 220/560.12 |

FOREIGN PATENT DOCUMENTS

| | | |
|---|---|---|
| DE | 196 45 492 | 7/1998 |
| DE | 10249250 | 5/2004 |
| EP | 0840056 | 5/1998 |
| GB | 2398115 | 11/2004 |
| WO | WO 2005/028947 | 3/2005 |
| WO | WO-2005028946 | 3/2005 |

OTHER PUBLICATIONS

U.S. Appl. No. 11/235,029, filed Sep. 2005, DaSilva et al.
U.S. Appl. No. 11/235,030, filed Sep. 2005, Rainer Immel.
U.S. Appl. No. 11/235,035, filed Sep. 2005, DaSilva et al.
U.S. Appl. No. 11/235,058, filed Sep. 2005, Immel et al.

* cited by examiner

Primary Examiner—Anthony Stashick
Assistant Examiner—Shawn M Braden
(74) Attorney, Agent, or Firm—Harness, Dickey & Pierce, P.L.C.

(57) ABSTRACT

A cryogenic storage tank having an insulated inner vessel disposed within an outer vessel. A common-access tube or conduit is used to route the various fluid flow lines into the interior of the inner vessel. The use of a common-access tube reduces the number of obstructions that the insulation must accommodate and facilitates the production of the storage tank.

20 Claims, 10 Drawing Sheets

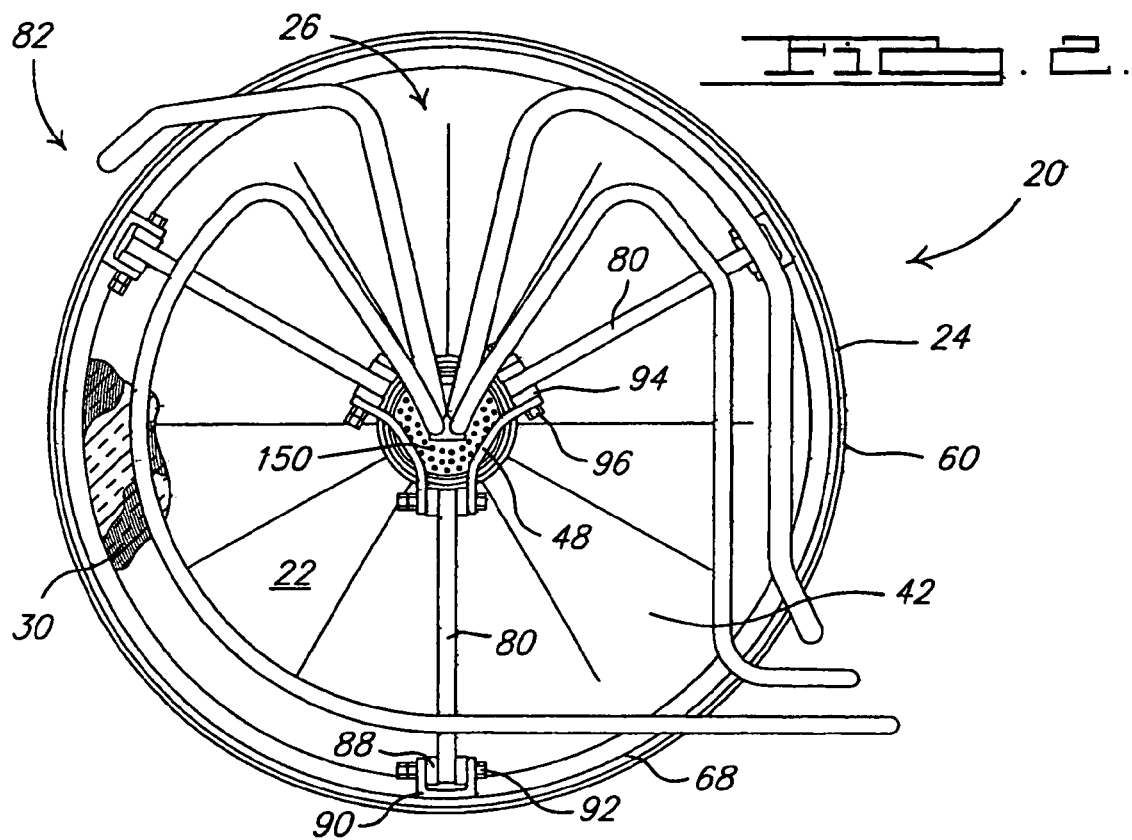
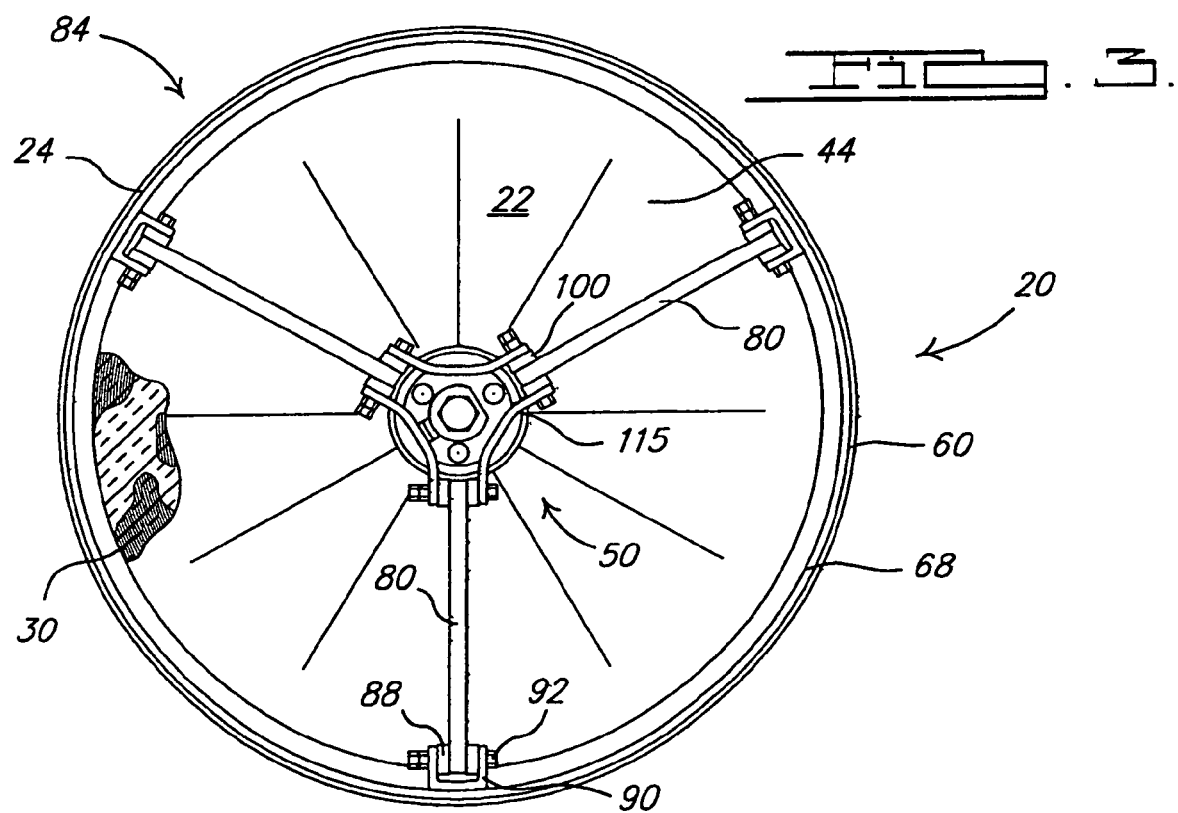

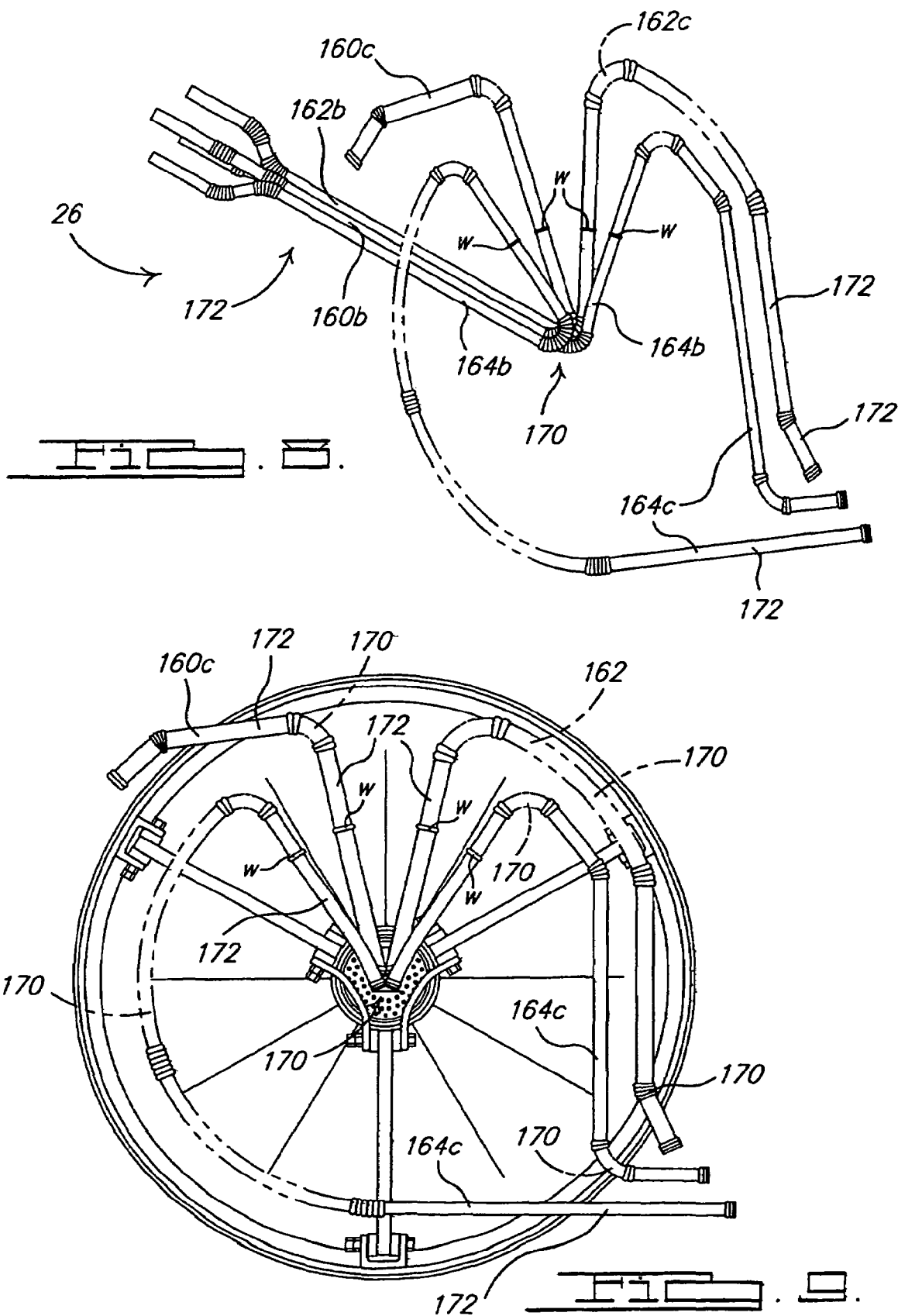

LIQUID HYDROGEN STORAGE TANK WITH COMMON-ACCESS TUBE AS PORT FOR PIPES INTO THE INNER VESSEL

FIELD OF THE INVENTION

The present invention relates to storage tanks, and more particularly to liquid hydrogen storage tanks.

BACKGROUND OF THE INVENTION

Typical multi-layered vacuum super insulated cryogenic tanks utilize a pair of cylindrical inner and outer tanks that are arranged concentrically with the inner tank residing in an interior of the outer tank. There are multiple radiant heat shields (insulation layers), approximately 30-80, coiled around the inner tank between the inner and outer tanks. A high vacuum exists between the inner and outer tanks to further prevent heat transfer. This type of thermal insulation is called a multi-layered vacuum super insulation. These storage tanks are capable of storing fluids at cryogenic temperatures.

The inner tank is positioned within the outer tank so that the inner tank does not contact the outer tank and so that thermal conduction paths between the inner and outer tanks are minimized. The fluid is supplied to and removed from the inner tank through a plurality of discrete fluid lines that extend through the outer tank, the vacuum between the inner and outer tanks, and into the inner tank at separate locations. Each of these fluid lines is a conductive heat path that can result in parasitic heat leaks into the inner tank.

The fluid lines are typically of a double wall construction inside the inner tank with a vacuum insulation therebetween to reduce the parasitic heat leaks into the inner tank. The double wall vacuum insulation shares the vacuum with the gap between the inner and outer tanks. The double wall fluid lines inside the inner tank typically have long horizontal runs and one or more bends or changes in direction. This construction has various drawbacks. The bending of the multiple double wall fluid lines is difficult and time consuming. Additionally, the use of discrete double wall fluid lines results in multiple obstructions in the wrapping of the insulation layers around the exterior of the inner tank. The insulation layers need to be cut for each of these obstructions. Each of these cuts/breaks in the insulation layers results in a potential thermal shortcut for a parasitic heat leak into the inner tank. Furthermore, the cutting of the insulation layers is time consuming and makes automated production difficult. Moreover, the long horizontal runs may develop a homogenous temperature profile and lead to additional parasitic heat leaks through natural convection. Thus, it would be advantageous to provide a storage tank that reduces or minimizes these drawbacks.

SUMMARY OF THE INVENTION

The present invention reduces and/or eliminates one or more of the above-described drawbacks. The present invention utilizes a common-access vacuum tube or conduit to route the various fluid lines into the interior of the inner tank. The use of a single common-access vacuum tube reduces the number of obstructions that the insulation layers must accommodate on the exterior of the inner tank. The use of a common-access vacuum tube also facilitates the production of such tanks. The common-access vacuum tube can be positioned on an axial center position of an end portion of the inner tank to thereby: further reduce the obstructions to the insulation layers and, facilitate automated and/or mass production of such tanks. The common-access vacuum tube can slope within the inner tank to provide a favorable temperature profile that contributes to the insulation of the fluid lines and reduces parasitic heat leaks.

In one aspect of the present invention, a cryogenic storage tank is disclosed. The tank includes a fluid-tight outer vessel and a fluid-tight inner vessel located within the outer vessel. A vacuum exists, between the outer vessel and the inner vessel. A plurality of fluid flow lines extends from an exterior of the inner vessel into and communicates with an interior of the inner vessel. A tube extends into and is sealed from the interior of the inner vessel and communicates with the exterior of the inner vessel. The at least two of the fluid lines extend into the interior of the inner vessel through the tube.

In another aspect of the present invention, another cryogenic storage tank is disclosed. The storage tank includes a fluid-tight outer vessel and a fluid-tight-inner vessel disposed within the outer vessel in a spaced relation therefrom. The inner vessel has a central segment and axially-opposite end segments that define an interior of the inner vessel. The interior is operable to store fluid therein. There is a vacuum between the inner and outer vessels. At least one insulation layer is between the inner and outer vessels. There is a conduit with opposite first and second ends. A first end is fluid tight and is disposed in the interior of the inner vessel. The second end communicates with the vacuum between the inner and outer vessel. A plurality of fluid lines extends between the interior of the inner vessel and an exterior of the inner vessel through the conduit.

In still another aspect of the present invention, a method of operating a cryogenic storage tank having an inner fluid-tight vessel located within an outer fluid-tight vessel and having a vacuum therebetween is disclosed. The method includes: (1) selectively supplying a liquid fluid to an interior of the inner vessel with a liquid fill line that enters the interior of the inner vessel through a tube that extends between the interior of the inner vessel and an exterior of the inner vessel and shares the vacuum between the inner and outer vessels; and (2) selectively removing a gaseous fluid from the interior of the inner vessel with a gas extraction line that enters the interior of the inner vessel through the tube.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is an end plan view of one end of the storage tank of FIG. 1;

FIG. 3 is an end plan view of the opposite end of the storage tank of FIG. 1 showing the preloading mechanism;

FIG. 8 is a perspective view of the corrugated piping used in the storage tank of FIG. 1;

FIG. 9 is an end plan view of the tank of FIG. 1 showing the fluid piping that passes into the central tube;

FIGS. 14-17-are flowcharts of the various assembly steps for forming the storage tank of FIG. 1.

DETAILED DESCRIPTION OF THE PREFERRED EMBODIMENT

The following description of the preferred embodiment is merely exemplary in nature and is in no way intended to limit the invention, its application, or uses.

Figure 1:
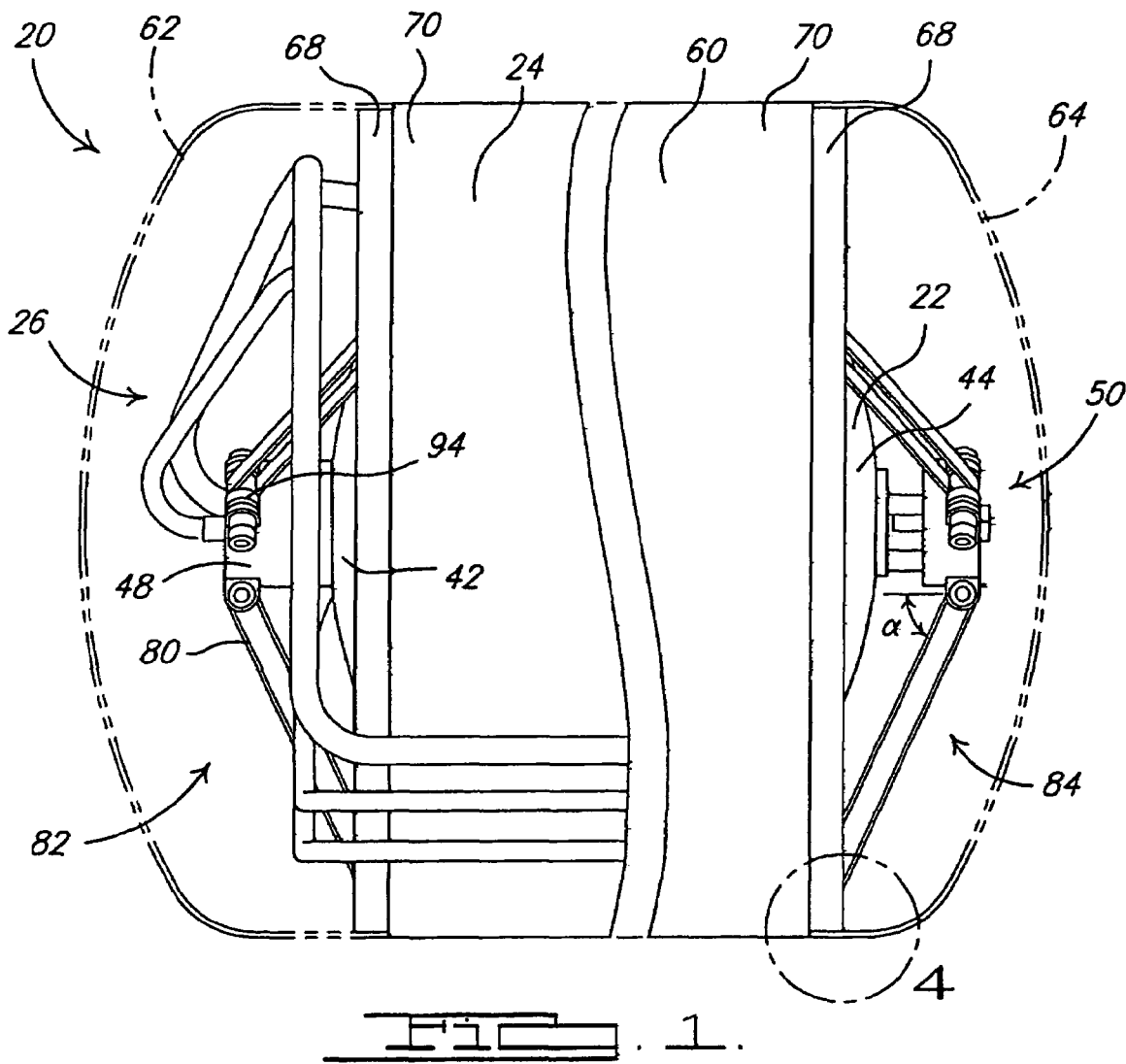
FIG. 1 is a fragmented front plan view of a cryogenic storage tank according to the principles of the present invention with the end caps in phantom.

A cryogenic storage tank 20 according to the principles of the present invention is shown in FIG. 1. Storage tank 20 includes an inner tank/vessel 22 that is suspended within an outer tank/vessel 24 in a spaced relation therefrom. Inner and outer vessels 22, 24 are both fluid-tight vessels. Inner vessel 22 is operable to store a fluid, such as liquid hydrogen, therein at cryogenic temperatures. A plurality of fluid flow lines 26 provide fluid flow paths from an exterior of outer vessel 24 into an interior of inner vessel 22 and enter inner vessel 22 through a common-access-tube 28 (FIG. 7A), as described in more detail below. Fluid flow lines 26 allow a fluid to be inserted into and removed from the interior of inner vessel 22. A plurality of insulation layers 30 are wrapped around the exterior of inner vessel 22 in the space between the inner and outer vessels 22, 24. A vacuum exists between inner and outer vessels 22, 24 and within common-access tube 28. The insulation layers 30 and the vacuum reduce heat influx into the interior of inner vessel 22. Storage tank 20 can be used on mobile platforms, such as vehicles, or in stationary applications.

Referring now to FIGS. 1, 2, 3 and 7A, inner vessel 22 includes a central segment 40 and a pair of end segments or end caps 42, 44. End caps 42, 44 are welded to central segment 40 to define an interior space or volume 46 of inner vessel 22. Common-access tube 28 is attached, such as by welding, to an opening in end cap 42 and extends from end cap 42 into interior 46 of inner vessel 22. Common-access tube 28 is attached to end cap 42 prior to end cap 42 being welded to central segment 40. Additionally, fluid flow lines 26 are also positioned through and secured within common-access tube 28 prior to end cap 42 being welded to central segment 40, as described below. A bracket 48 is attached, such as by welding, to an exterior of end cap 42. A tensioning mechanism 50 is attached to end cap 44. Bracket 48 and tensioning mechanism 50 provide attachment points for suspending inner vessel 22 within outer vessel 24, as described below.

Figure 4:
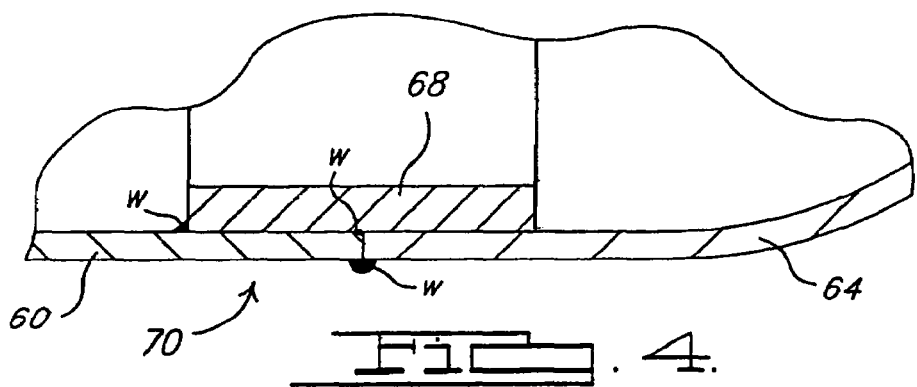
FIG. 4 is a partial cross-sectional view within circle 4 of FIG. 1 showing the overlap of the annular stiffening member with the central and end segments of the outer tank.

Outer vessel 24 includes a central segment 60 and two end segments or end caps 62, 64 that are welded to opposing ends of central segment 60. Central segment 60 has a generally uniform wall thickness. A pair of annular stiffening members/rings 68 is welded to opposing end portions 70 of central segment 60. Stiffening members 68 extend across the juncture of central segment 60 with end caps 62, 64, as shown in FIGS. 1 and 4. Stiffening members 68 provide support for central segment 60 and limit deformation thereof due to the suspending of inner vessel 22 within outer vessel 24, as described below. Stiffening members 68, due to the overlapping of the juncture of central segment 60 with end caps 62, 64, also serve to prevent sparks and other welding debris and gases from entering into the space between inner and outer vessels 22, 24 and from contacting insulation layers 30 therein when welding end cap 62, 64 to central segment 60. Optionally, stiffening members 68, can be attached to the exterior of central segment 60, although all the benefits of the present invention may not be realized. The attachment of end caps 62, 64 to central segment 60 provides additional support for central segment 60 and limits deformation thereof due to the suspending of inner vessel 22 within outer vessel 24.

Referring now to FIGS. 1-3, 5 and 6, details of the suspending of inner vessel 22-within outer vessel 24 are shown. Inner vessel 22 is suspended within outer vessel 24 with a plurality of suspension members 80. A first group 82 of suspension members 80 is coupled to one end portion 70 of central segment 60 of outer-vessel 24 and to end cap 42 of inner vessel 22. A second group 84 of suspension members 80 is coupled to the other end portion 70 of central segment 60 of outer vessel 24 and to end cap 44 of inner vessel 22.

Each group 82, 84 includes three, suspension members 80 that are equally spaced about each end cap 42, 44 of inner vessel 22. For example, each suspension member 80 is spaced apart about 120 degrees. Each suspension member 80 is a continuous cord in the form of a fixed-length loop. Preferably, each cord is flat and has a small cross-sectional area to minimize the heat path. The suspension members or cords can be made from a variety of materials. For example, each suspension member can be a carbon-fiber rope with an epoxy matrix. Such a material is stiff and readily facilitates the manufacturing of such a cord in a closed continuous loop. Other materials include, but are not limited to, the use of woven glass fiber, woven Kevlar fiber, and other rope-like materials. It should be appreciated that while suspension members 80 are preferably in the form of closed-loop cords, individual strips or sections of cords that are not looped can also be utilized. Such cords would be secured to the appropriate attachment mechanisms coupled to the central segment 60 of outer vessel 24 and to end caps 42, 44 of inner vessel 22. It should also be appreciated that while three suspension members 80 are shown as being used to support each end of inner vessel 22, a single continuous suspension member (not shown) could be utilized to support each end of inner vessel 22 by routing or wrapping each suspension member through the various attachment mechanisms associated with each side of storage tank 20 and providing three distinct tensile segments that extend between each end of inner vessel 22 and outer vessel 24.

In the embodiment shown, three suspension members 80 in the form of closed loops are used to support each end of inner vessel 22 within outer vessel 24. Specifically, each suspension member 80 of first and second groups 82, 84 is wrapped around an associated roller 88 which is coupled to one of the stiffening members 68 on each end portion 70 of central segment 60 of outer vessel 24 by an associated bracket 90 and bolt 92. Each suspension member 80 of first group 82 is also wrapped around an associated roller 94 coupled via a bolt 96 to bracket 48 attached to the axial center portion of end cap 42 of inner vessel 22. Alternately, a portion of common-access tube 28 could extend (not shown) outwardly beyond end cap 42 and provide an attachment point for rollers 94 in lieu of bracket 48. Each suspension member 80 of second group 84 is also wrapped around an associated roller 100 which is coupled to tensioning mechanism 50 attached to end cap 44 of inner vessel 22. Preferably, bracket 48 and tensioning mechanism 50 are attached to axially center portions of each end cap 42, 44 of inner vessel 22 to provide centralized support of inner vessel 22 within outer vessel 24.

Figure 5:
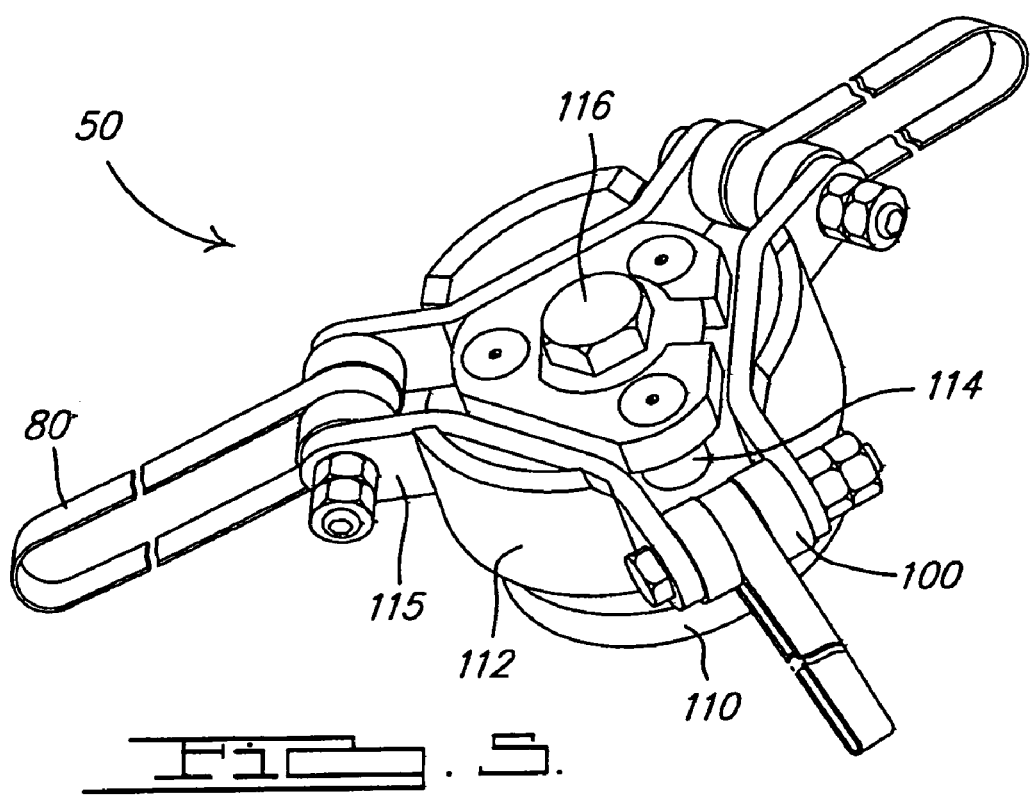
FIGS. 5 and 6 are perspective views of the preloading mechanism used on the-storage tank of FIG. 1 with the preloading mechanism partially cutaway in FIG. 6.
Figure 6:
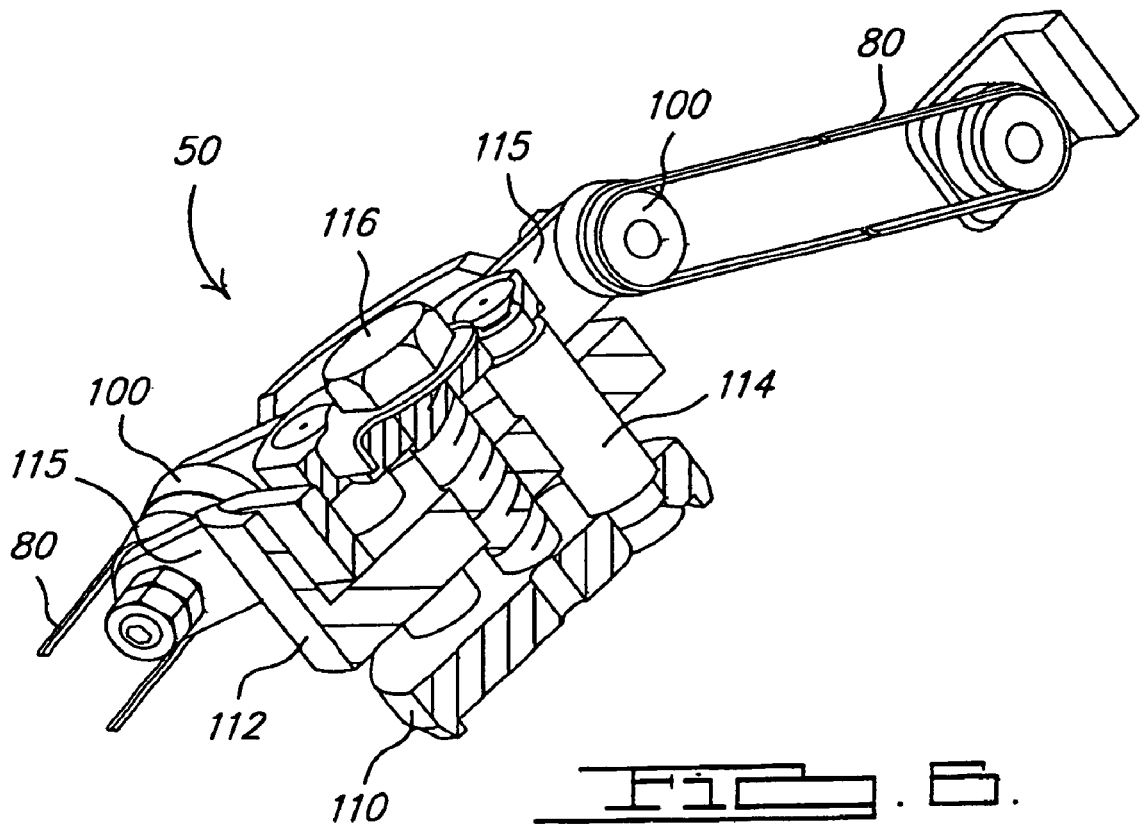

Referring now to FIGS. 3 and 5-6, details of tensioning mechanism 50 are shown. A base plate 110 is attached to end cap 44 of inner vessel 22, such as by welding. A movable plate 112 is axially movable relative to base plate 110 along fixed guides 114. Bracket members 115 are fixedly attached to movable plate 112. Rollers 100 are bolted to bracket members 115. A threaded adjusting member 116 extends through a threaded opening in movable plate 112 and contacts base plate 110. The threaded engagement between adjusting member 116 and movable plate 112 translates rotation of adjusting member 116 into axial movement of movable plate 112 relative to base plate 110 along guides 114. As movable plate 112 moves relative to base plate 110, the tension in suspension members 80 will vary.

To suspend inner vessel 22 within outer vessel 24, an inner vessel assembly is positioned within central segment 60 of outer vessel 24. The inner vessel assembly includes inner vessel 22 with insulation layers 30 wrapped thereon and fluid flow lines 26 extending outwardly from common-access tube 28. The portions of fluid flow lines 26 that are exterior to inner vessel 22 can be configured into a desired shape or orientation prior to the positioning of the inner vessel assembly within central segment 60. Alternately, the fluid flow lines 26 can remain straight or out of way and be bent into a desired configuration after suspending inner vessel 22 within outer vessel 24. The suspension of the inner vessel assembly within outer vessel 24 is described in more detail below.

In the present invention, suspension members 80 are intended to be under tensile loading at all times. While suspension members 80 may have a stiffness associated with their specific materials of construction, it should be appreciated that suspension members 80 are not intended to be subjected to any appreciable compressive loading. Suspension members 80 are sized to provide the required support of inner vessel 22 within outer vessel 24 and for the fluids to be stored within inner vessel 22. Additionally, suspension members 80 are designed to be operable to withstand sudden accelerations/decelerations when storage tank 20 is located on at movable platform, such as a vehicle. Furthermore, the dimensions of suspension members 80 are designed to minimize the heat path into inner vessel 22. Moreover, it should be appreciated that the angle a at which suspension members 80 extend from their associated brackets on inner vessel 22 toward end portions 70 of central segment 60 of outer vessel 24 relative to the axial axis of inner vessel 22 provides differing amounts of axial support. The smaller the angle, the greater the amount of axial support provided to inner vessel 22. On the other hand, the smaller the angle, the greater the intrusion of suspension members 80 into the interior space between inner and outer vessels 22, 24. The larger intrusion decreases the volume of storage tank 20 for a given size tank. Thus, the angle a is chosen based on one or more of these design considerations.

Figures 13A, 13B:
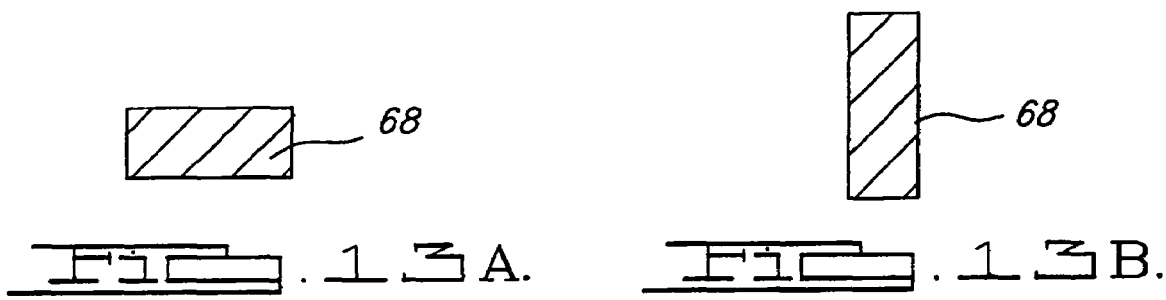
FIGS. 13A-F are cross-sectional views of various configurations for the annular stiffening members used in the storage tank of FIG. 1.
Figures 13C, 13D:
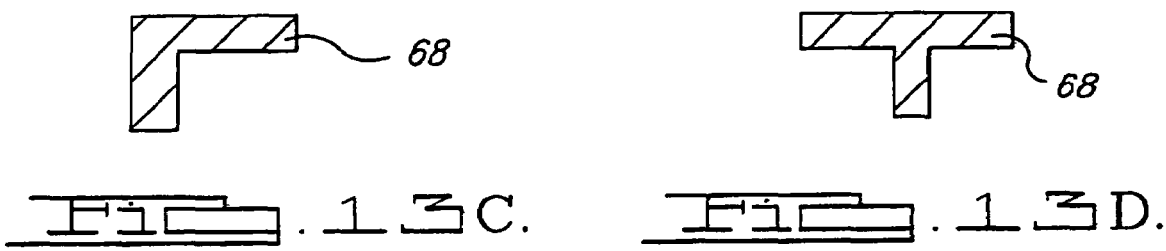
Figures 13E, 13F:
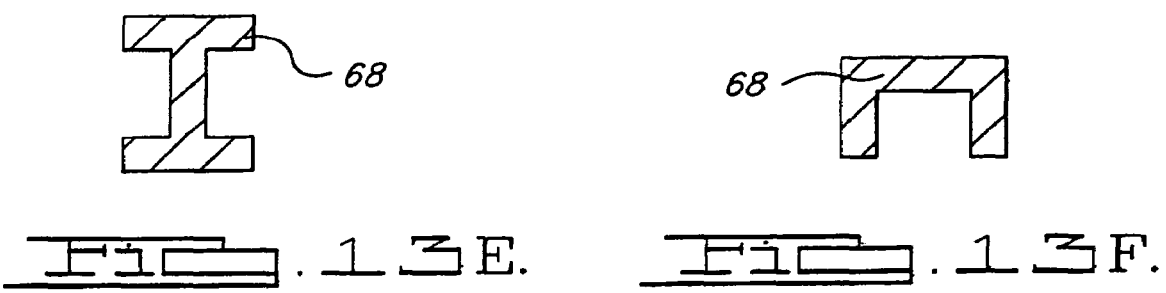
Figure 14:
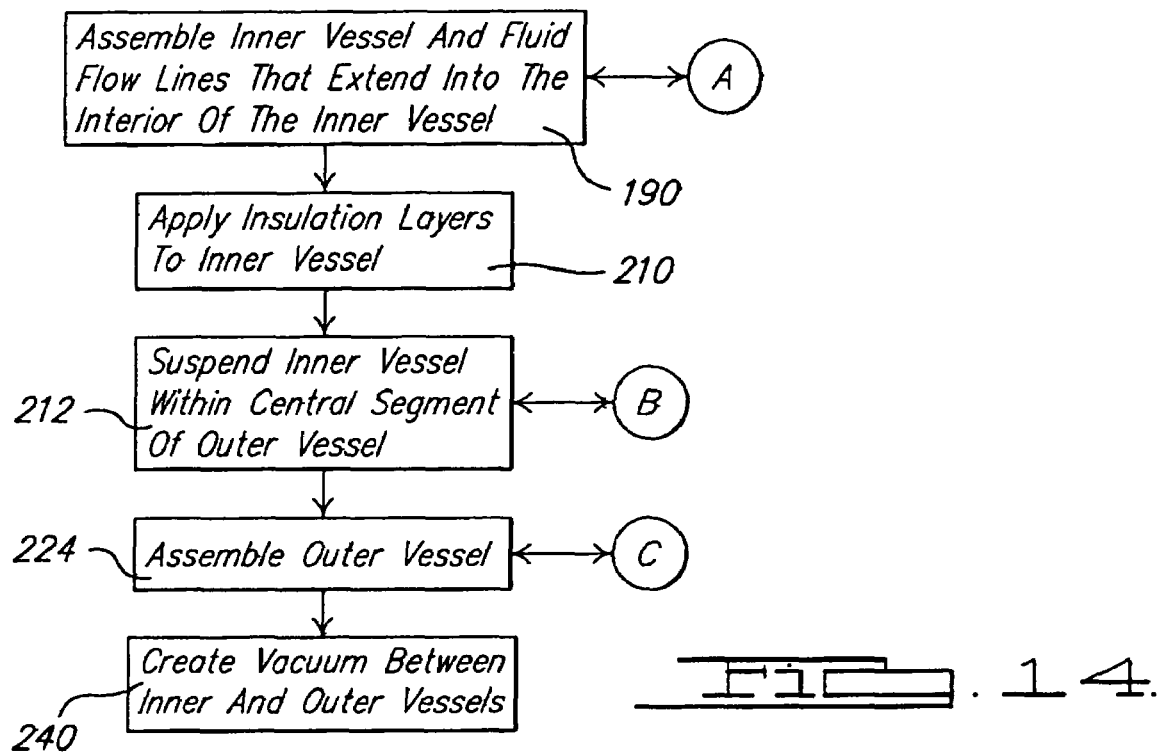

Stiffening members 68 serve to reinforce central segment 60 of outer vessel 24 and limit the deformation of central segment 60 due to the suspension of inner vessel 22 within outer vessel 24. Limiting the deformation facilitates the aligning and attachment of end caps 62, 64 to central segment 60. To accomplish this, brackets 90 are attached, such as by welding, directly to stiffening members 68 so that suspension members 80 directly impart their tensile loading on stiffening members 68. The tensile load on stiffening members 68 is transmitted to central segment 60 and distributed along end portions 70. Stiffening members 68 can take a variety of cross-sectional shapes. For example, as shown in FIGS. 13A and 13B, stiffening members 68 can be rectangular in cross-section with the longer side extending either axially or radially, respectively. The cross-section of stiffening member 68 can be L-shaped, as shown in FIG. 13C, T-shaped, as shown in FIG. 13D, I-shaped, as shown in FIG. 13E, and inverted U-shaped, as shown in FIG. 13F. Each of these different cross-sectional configurations will provide support for suspending inner vessel 22 within outer vessel 24 and limit the deformation of outer vessel 24. It should be appreciated that the cross-sectional shapes shown for stiffening members 68 are merely exemplary and that other cross-sectional, shapes or combinations thereof can be utilized. The particular cross-sectional shape chosen will vary depending upon the design needs of the particular storage tank 20 being built.

Figure 11:
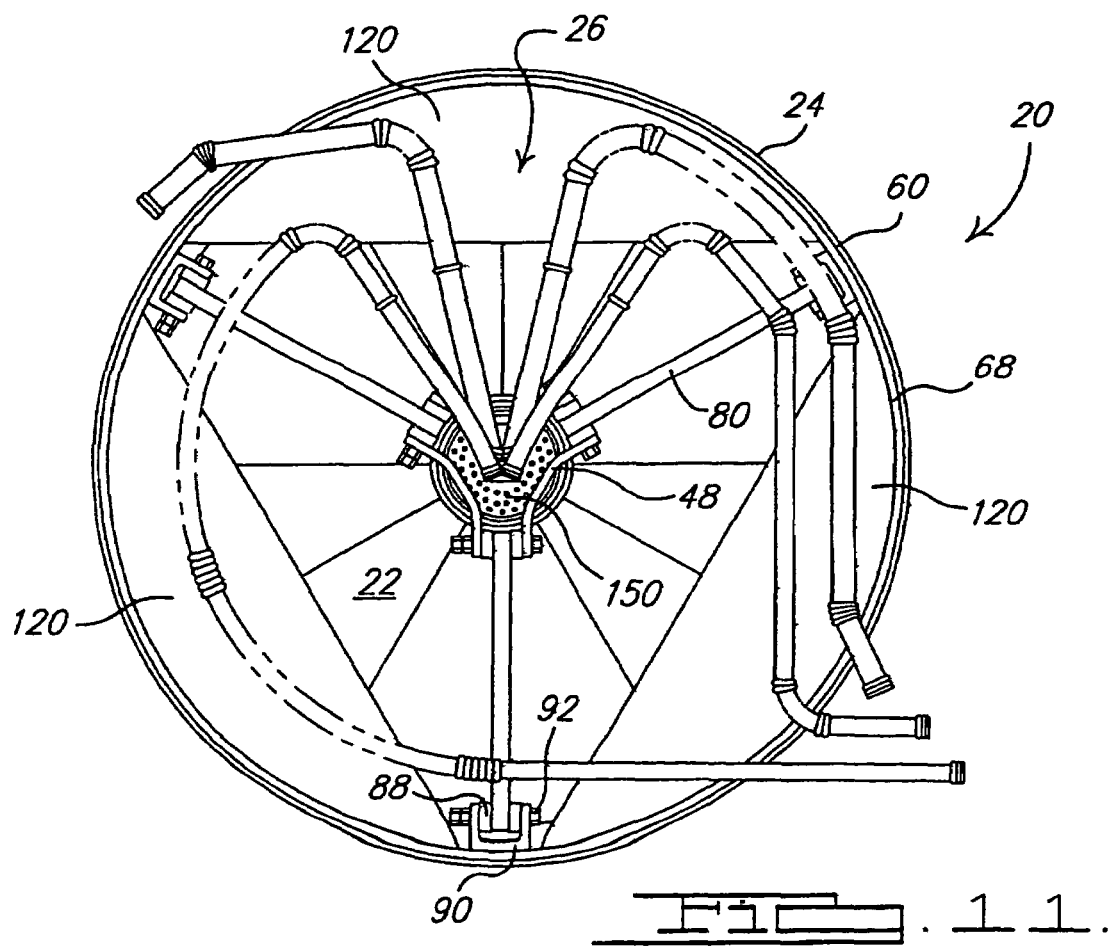
FIG. 11 is an end plan view of the storage tank of FIG. 1 showing the addition of three sectional stiffening members.
Figure 12:
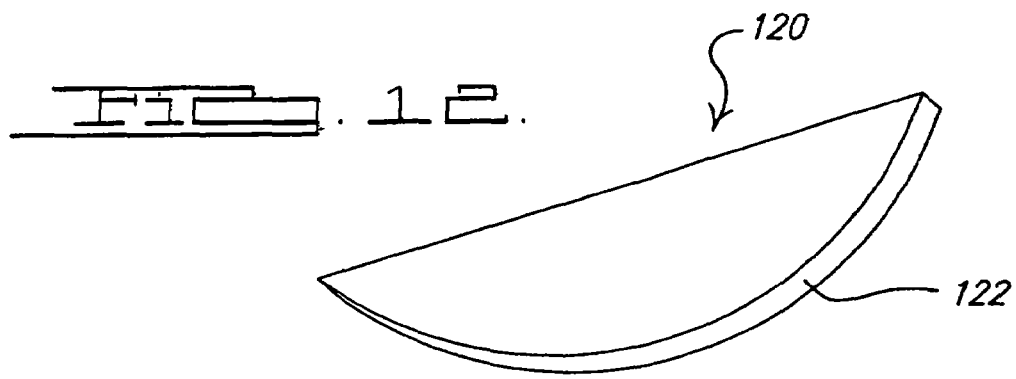
FIG. 12 is a perspective view of one of the sectional stiffening members of FIG. 11.

Referring now to FIGS. 11 and 12, an alternate configuration for the stiffening of outer vessel 24 is shown. In this configuration, three sectional stiffeners 120 are utilized on each end portion 70 of central segment 60 of outer vessel 24. Sectional stiffeners 120 are disposed between the attachment points for suspension members 80. Sectional stiffeners 120 serve to provide additional stiffening to the end portions 70 between suspension members 80. Sectional stiffeners 120 are partially circular shaped in plan view and have a side edge 122 shaped to correspond to the interior of annular stiffening members 68. Sectional stiffeners 120 are welded to stiffening members 68 to provide additional support thereto. It may be possible to use sectional stiffeners 120 in lieu of annular stiffening members 68. That is, depending upon the design of central segment 60 and the loading imparted on central segment 60 by suspension members 80, the use of sectional stiffeners 120 welded directly to end portions 70 may sufficiently limit deformation of central segment 60 such that attachment of end caps 62, 64 is not impeded. Thus, central segment 60 of outer vessel 24 can be reinforced with annular stiffening members 68, sectional stiffeners 120 or a combination of both. These stiffening features of the present invention provide localized support for specific portions of central segment 60 of outer vessel 24 during assembly. These stiffening features also provide localized support to both central segment 60 and end cap 62, 64 during operation of storage tank 20. Additionally, it should be appreciated that the addition of end caps 62, 64 to central segment 60 will also provide additional support for central segment 60 and support a portion of the load imparted by the suspension of inner vessel 22 therein. The use of such stiffening members advantageously provides the localized support and rigidity where necessary without increasing the wall thickness or structural rigidity of central segment 60 solely to allow the suspension of inner vessel 22 therein prior to the attachment of end caps 62, 64. Thus, the use of stiffening members enables the use of a central segment 60 having a thickness that is substantially uniform throughout its axial length.

Figure 7A:
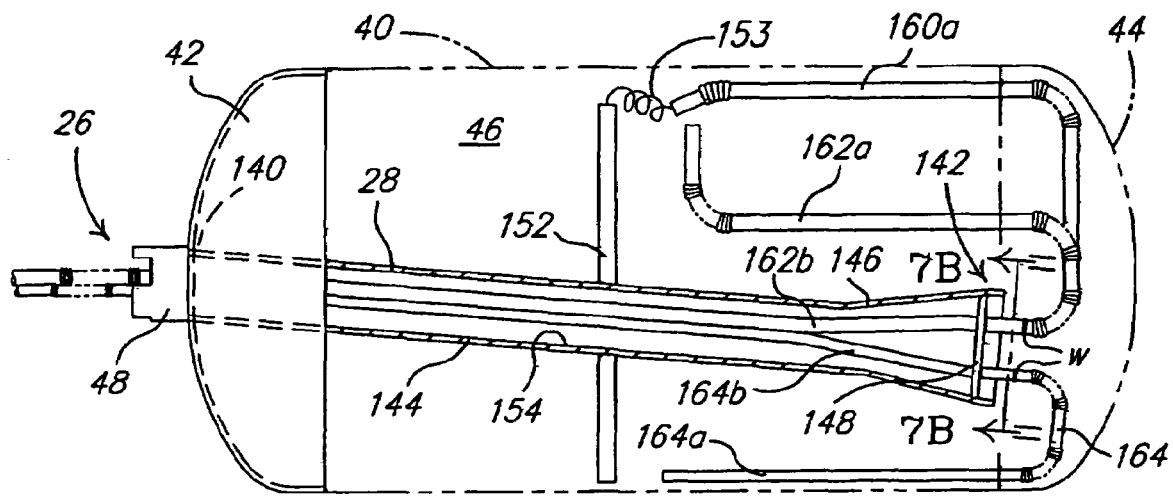
FIG. 7A is a partially cutaway front plan view of the storage tank of FIG. 1 showing the common-access tube with flared end and the fluid flow lines, passing therethrough.
Figure 7B:
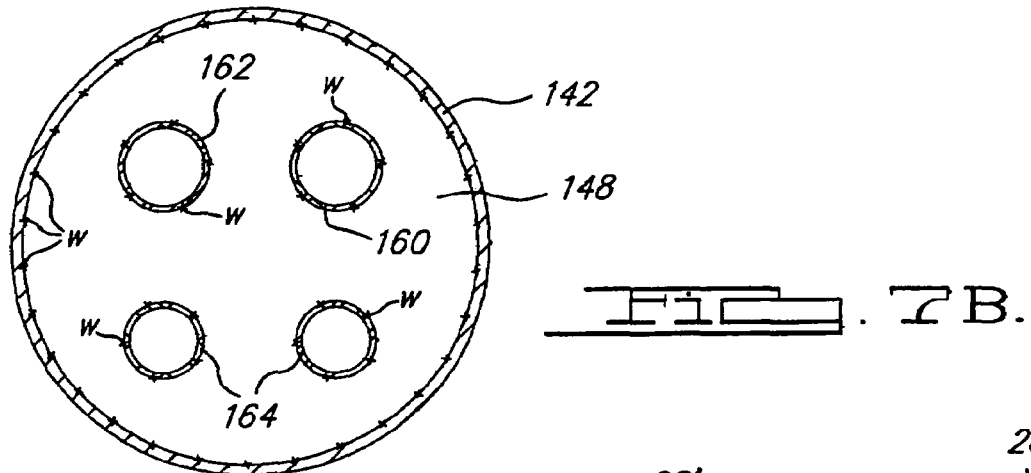
FIG. 7B is an end plan view along line 7B-7B of FIG. 7A showing the attachment of the pipes within the common-access tube to the end plate on the flared end of the common-access tube.

Referring now to FIGS. 7A and B, details of common-access tube 28 and the routing of fluid flow lines 26 into the interior 46 of inner vessel 22 are shown. A first end 140 of common-access tube 28 is attached to end cap 42 of inner vessel 22. A second end 142 of common-access tube 28 is cantilevered into interior 46 of inner vessel 22. Common-access tube 28 has an axial length between first and second ends -140, 142. Common-access tube 28-has a first portion 144 with a substantially uniform diameter and a second (flared) portion 146 having a changing diameter. First and second portions 144, 146 share a common axial axis. An end plate 148 is welded to second end 142 of common-access tube 28 and forms a fluid-tight seal therewith, as shown in FIG. 7B and indicated as W. A perforated end plate 150 (shown in FIG. 2) is disposed in first end 140. Fluid flow lines 26 run through common-access tube 28 and into interior 46 of inner vessel 22 through end plates 148, 150. Preferably, as shown, all fluid flow lines 26 enter interior 46 of inner vessel 22 through common-access tube 28. Additionally, it is also preferred that all communication/data/power/etc lines, such as wires, connectors and cables, such as those connecting to a level sensor 152, are also routed through common-access tube 28 within one or more of the fluid flow lines 26. Level sensor 152 is attached to an exterior of common-access tube 28 and is within interior volume 46 of inner vessel 22. Level sensor 152 is operable to provide a signal indicative of the liquid level within inner vessel 22. The communication line 153 for level sensor 152 exits inner vessel 22 through one of the fluid flow lines 26. The use of common-access tube 28 to route all the piping and communication/data/power/etc. lines into interior 46 of inner vessel 22 advantageously reduces the number of obstructions on the exterior of inner vessel 22 around which insulation layers 30 must be routed. Additionally, the number of heat flow shortcuts are reduced along with facilitating the automated application of insulation layers 30.

First end 140 is preferably attached to an axial center portion of end cap 42 of inner vessel 22. This attachment location centralizes the obstruction caused by fluid flow lines 26 leaving inner vessel 22 and aligns with the bracket 48 used to attach first group 82 of suspension members 80 to end cap 42 of inner vessel 22. The centralized aligning of these various features facilitates the wrapping of the insulation layers 30, either manually or automated, which are generally wrapped in a tangential direction and folded over on the end caps 42, 44.

Fluid flow lines 26 are spaced apart from the interior wall 154 of common-access tube 28. Fluid flow lines 26 may touch one another or be spaced apart from one another within common-access tube 28. Preferably, fluid flow lines 26 are spaced apart from one another. Fluid flow lines 26 diverge from one another in flared portion 146 to pass through end plate 148 in a spaced relation, as shown in FIG. 7B. Preferably, fluid flow lines 26 are evenly spaced apart when passing through end plate 148. The spacing facilitates the fluid-tight welding of each fluid flow line 26 to end plate 148. That is, the increased diameter of second portion 146 allows fluid flow lines 26 to be spaced apart a distance sufficient to manipulate a welding device around the perimeter of each fluid flow line 26 with limited interference caused by the adjacent fluid flow lines.

The volume of interior 46 of inner vessel 22 occupied by common-access tube 28 is advantageously reduced with first portion 144 of common-access tube 28 having a smaller diameter than flared portion 146. That is, if the entire length of common-access tube 28 were of a diameter sufficient to facilitate the welding of fluid flow lines 26 to end plate 148 with limited interference from each other, the overall volume of common-access tube 28 within interior 46 of inner vessel 22 would be increased. Increasing the volume of common-access tube 28 decreases the fluid-holding capacity of inner vessel 22.

Common-access tube 28 is angled such that second end 142 is nominally lower than first end 140. This angling provides an advantageous temperature profile along the fluid flow lines 26 and common-access tube 28 wherein the colder fluid is at the lower elevation than the warmer fluid. This helps minimize parasitic heat leaks from natural convection inside fluid flow lines 26. Preferably, common-access tube 28 extends substantially the entire axial length of inner vessel 22. By having common-access tube 28 extending as far as possible within inner vessel 22, a maximization of the heat-resisting effective length can be realized. It should be appreciated, however, that the total length that common-access tube 28 can extend within interior 46 of inner vessel 22 will be limited by the necessity of fluid flow lines 26 exiting end plate 148 and the space required to route fluid flow lines 26 to their appropriate locations within interior 46 of inner vessel 22.

Figure 7C:
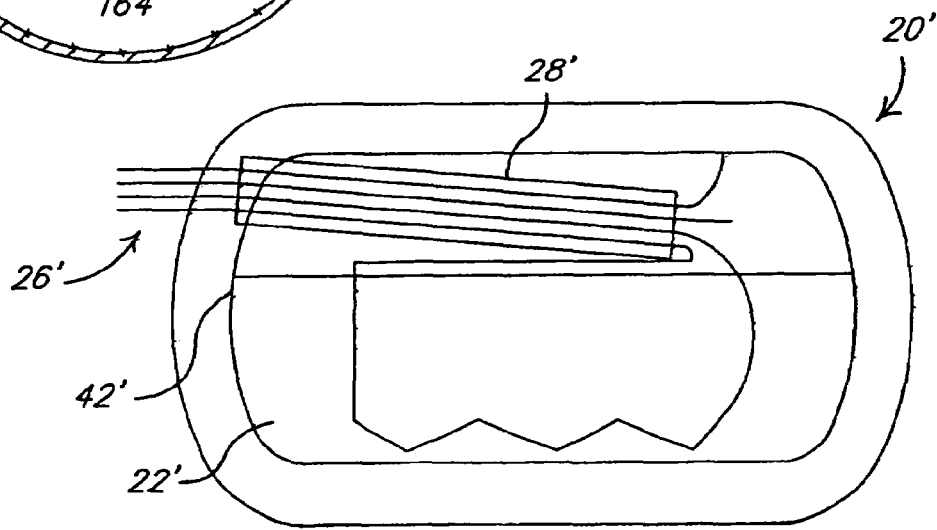
FIG. 7C is a schematic representation of an alternate arrangement of a common-access tube according to the principles of the present invention.

Referring now to FIG. 7C, a schematic representation of an alternate configuration for common-access tube 28' is shown. In this configuration, common-access tube 28' has a substantially uniform diameter and extends from a non-central portion of end cap 42' of inner vessel 22'. This configuration advantageously routes all the fluid flow lines 26' into interior volume 46' of inner vessel 22' through a single access location thereby minimizing the obstructions on the exterior of inner vessel 22' that must be accommodated by the insulation layers 30'. The uniform diameter of common-access tube 28', however, encompasses a greater volume of inner vessel 22' than that of common-access tube 28 described above and shown in FIG. 7A.

Accordingly, the use of a common-access tube advantageously minimizes the interference with applying insulation layers 30 to inner vessel 22. Additionally, use of a common-access tube also facilitates modular construction of cryogenic storage tank 20, as described in more detail below. Moreover, the use of a common-access tube can advantageously provide a desired temperature profile and reduce heat paths into the inner vessel.

Referring now to FIGS. 7A, 8 and 9, details of fluid flow lines 26 are shown. Fluid flow lines 26 extend from the exterior of cryogenic storage tank 20 and outer vessel 24 into interior 46 of inner vessel 22. Fluid flow lines 26 pass through openings in outer vessel 24, through the space between inner and outer vessels 22, 24 and into interior 46 of inner vessel 22 through common-access tube 28. Fluid flow lines 26 include a variety of different flow lines that each performs a different purpose or function. A liquid fill line 160 is used to fill inner vessel 22 with the desired fluid, such as hydrogen, in liquid form. A gas extraction line 162 is used to extract the fluid from inner vessel 22 in a gaseous form. As such, the end of gas extraction line 162 within interior 46 oft inner vessel 22 is adjacent the uppermost portion of central segment 40. A heat-exchange loop 164 can be used to facilitate the extraction of the fluid in gaseous form from inner vessel 22. Heat exchange loop 164 is used to selectively route a heating fluid through interior 46 of inner vessel 22. The routing of the heating fluid increases the temperature within inner vessel 22, thereby increasing the gaseous portion of the fluid stored therein. Additionally, the use of heat exchange loop 164 can also facilitate the maintaining of a desired operational pressure within inner vessel 22, thereby also facilitating the extraction of the fluid therefrom. In place of heat exchange loop 164, a liquid extraction line (not shown) could be employed. The liquid extraction line would have an end terminating in the lower portion of central segment 40 of inner vessel 22 and be used to extract liquid from inner vessel 22. If desired, an external heater can be used to convert the extracted liquid into gaseous form when it is desired to provide the fluid in gaseous form to a downstream component, such as a fuel cell stack or internal combustion engine.

Each fluid flow line 26 can be comprised of a plurality of discrete, unitary and uninterrupted sections or segments that are attached together, such as by welding, to form the entire fluid flow line. For example, as shown in FIG. 7A, each fluid flow line 160, 162, 164 can include respective interior segments 160*a*, 162*a*, 164*a* that are within interior 46 of inner vessel 22. Middle segments 160*b*, 162*b*, 164*b* extend from their respective interior segments through common-access tube 28 and into the space between inner and outer vessels 22, 24. Exterior segments 160*c*, 162*c*, 164*c* (shown in FIGS. 8 and 9) extend from the middle segments through the space between inner and outer vessels 22, 24 and either extend to the exterior of storage tank 20 or connect to other fluid piping lines attached to outer vessel 24 that communicate with piping external to cryogenic storage tank 20. Alternately, each segment a, b, c can be combined into a large single unitary uninterrupted segment that includes the interior, middle and exterior segments. As used herein, the term "unitary uninterrupted" segment or fluid flow line means that that segment or fluid flow line is formed in a continuous manner and not by the attaching of discrete segments to one another.

The portions of fluid flow lines 26 between inner and outer vessels 22, 24 extend upwardly upon exiting common-access tube 28, as shown in FIG. 9, to avoid a siphoning effect and to provide an advantageous thermal profile. Additionally, gas extraction line 162, or a liquid extraction line, if so equipped, can be wrapped around the exterior of inner vessel 22 in the space between inner and outer vessels 22, 24 to help with the maintaining of the low temperature in inner vessel 22 during the extraction of the fluid from inner vessel 22.

Figure 10A:
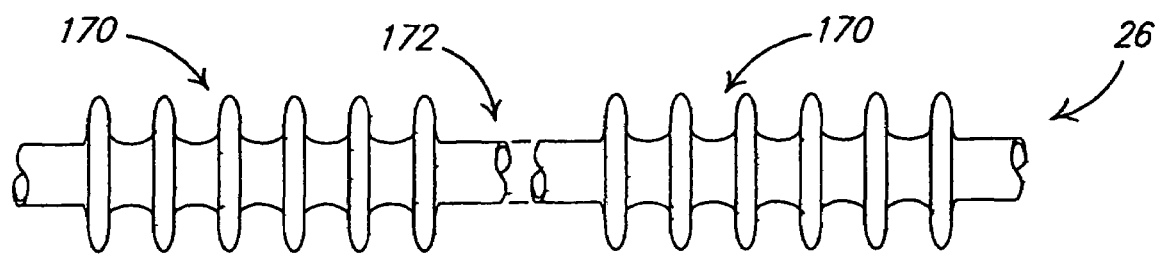
FIGS. 10A and 10B are simplified representations of the corrugations that can be utilized for the piping used in the storage tank of FIG. 1.
Figure 10B:
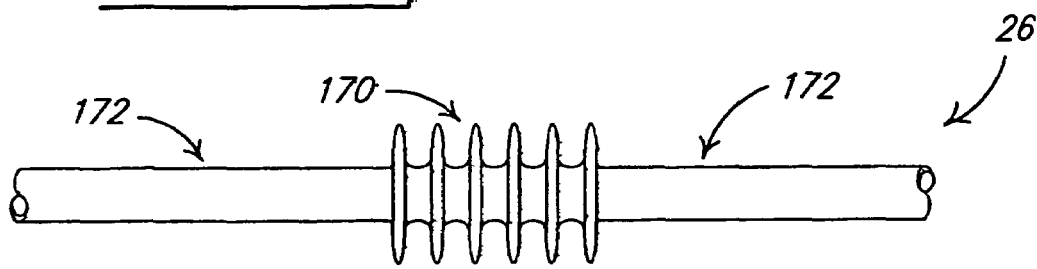

To facilitate the bending of the various fluid flow lines 26 into their desired orientation/configuration, each fluid flow line segment can include both corrugated portions and non-corrugated portions. For example, one segment of piping, such as that shown in FIG. 10A, can include multiple corrugated portions 170 with non-corrugated portions 172 therebetween. Additionally and/or alternately, as shown in FIG. 10B, a different segment of fluid flow line can include multiple non-corrugated portions 172 disposed around a corrugated portion 170. The number and location of corrugated portions 170 and non-corrugated portions 172 will vary depending upon the desired orientation of the particular fluid line segment when storage tank 20 is fully assembled. The corrugated portions can have varying gaps, heights and widths, as can be seen by comparing the corrugated portions 170 in FIG. 10A with the corrugated portions 170 in FIG. 10B. Additionally, the wall thickness of the particular fluid flow line can also vary. These various characteristics of corrugated portions 170 affect its stiffness and how easily it can be bent into a desired orientation. These characteristics also affect the maximum bend angle that can be imparted on that particular corrugated portion 170. Thus, not only will the numbering and arrangement of corrugated and non-corrugated portions 170, 172 vary for particular segments of fluid flow lines, the type of corrugation (gap, height, width and wall thickness) can also vary to provide a fluid flow line segment that can be readily and easily bent into a desired orientation for assembly of storage tank 20.

The various corrugated and non-corrugated portions 170, 172 of each fluid flow line segment are made to correspond to the specific needs of the particular fluid flow line segment. For example, as shown in FIGS. 7A and 8, each segment a, b, c of each fluid flow line 160, 162, 164 can have multiple corrugated and non-corrugated portions 170, 172. The corrugated portions 170 correspond to the locations where the various fluid flow lines are bent, such as at the end of the middle segment where the fluid lines flare away from each other to pass through end plate 148 of common-access tube 28. Additionally, the opposite ends of the middle segments can also have corrugated portions that facilitate the upward bending of these fluid flow lines in the space between the inner and outer vessels 22, 24. Furthermore, if desired, the interior segments 160*a*, 162*a*, 164*a* of these various fluid flow lines can also have corrugated portions 170 and non-corrugated portions 172 that correspond to the various portions of the fluid flow lines that are bent or remain straight.

The use of non-corrugated portions 172 in each of the fluid flow line segments provides a level of stiffness or rigidity that is not available when only corrugated portions are used. These non-corrugated portions 172 thereby help to stiffen the fluid flow line segments and maintain the fluid flow line segments in their desired orientation during operation of storage tank 20. The non-corrugated portions 172 also minimize and/or eliminate the need for additional bracing or framing to retain the fluid flow lines in their desired orientation during operation of storage tank 20. Additionally, by limiting the use of corrugated portions 170 to those areas that are required to be bent, the potential for elongation of the various fluid flow lines due to pressure differentials during the operation of storage tank 20 is reduced. Thus, the use of fluid flow line segments having both corrugated and non-corrugated portions is advantageous over the use of an entirely corrugated segment.

The use of corrugated and non-corrugated portions 170, 172 for the various segments of the fluid flow lines 26 also facilitates the assembly of storage tank 20 and, particularly, facilitates the construction of modular assemblies that can be-used to form storage tank 20. The various fluid flow lines 26 can be formed in straight and unbent segments with corrugated and non-corrugated portions 170, 172 dispersed throughout its length. These various segments can then be attached to one or more components, such as common-access tube 28 at end plates 148, 150 therein, or other fluid flow line segments to form a modular assembly. The modular assemblies can then be inserted into or attached to other components of storage tank 20 in a piecemeal fashion to form storage tank 20, as described below.

Figure 15:
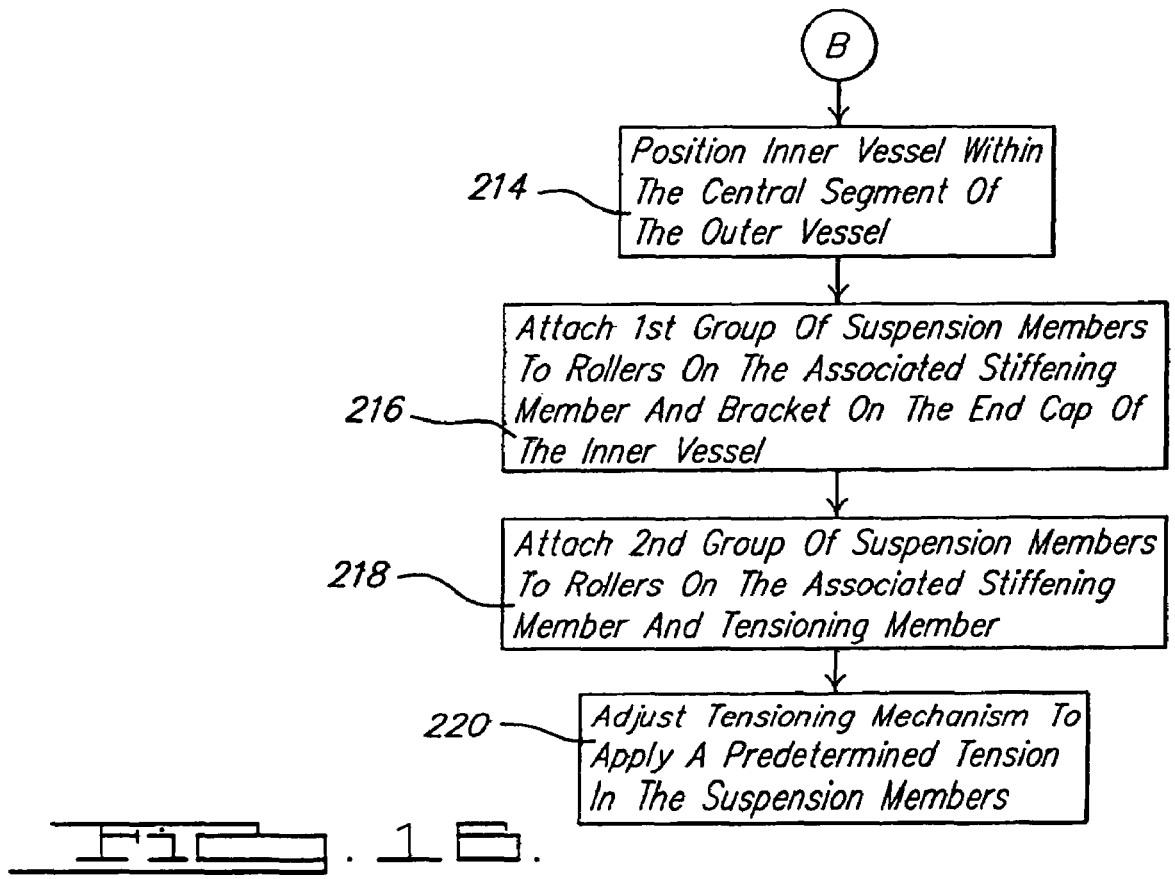
Figure 15:
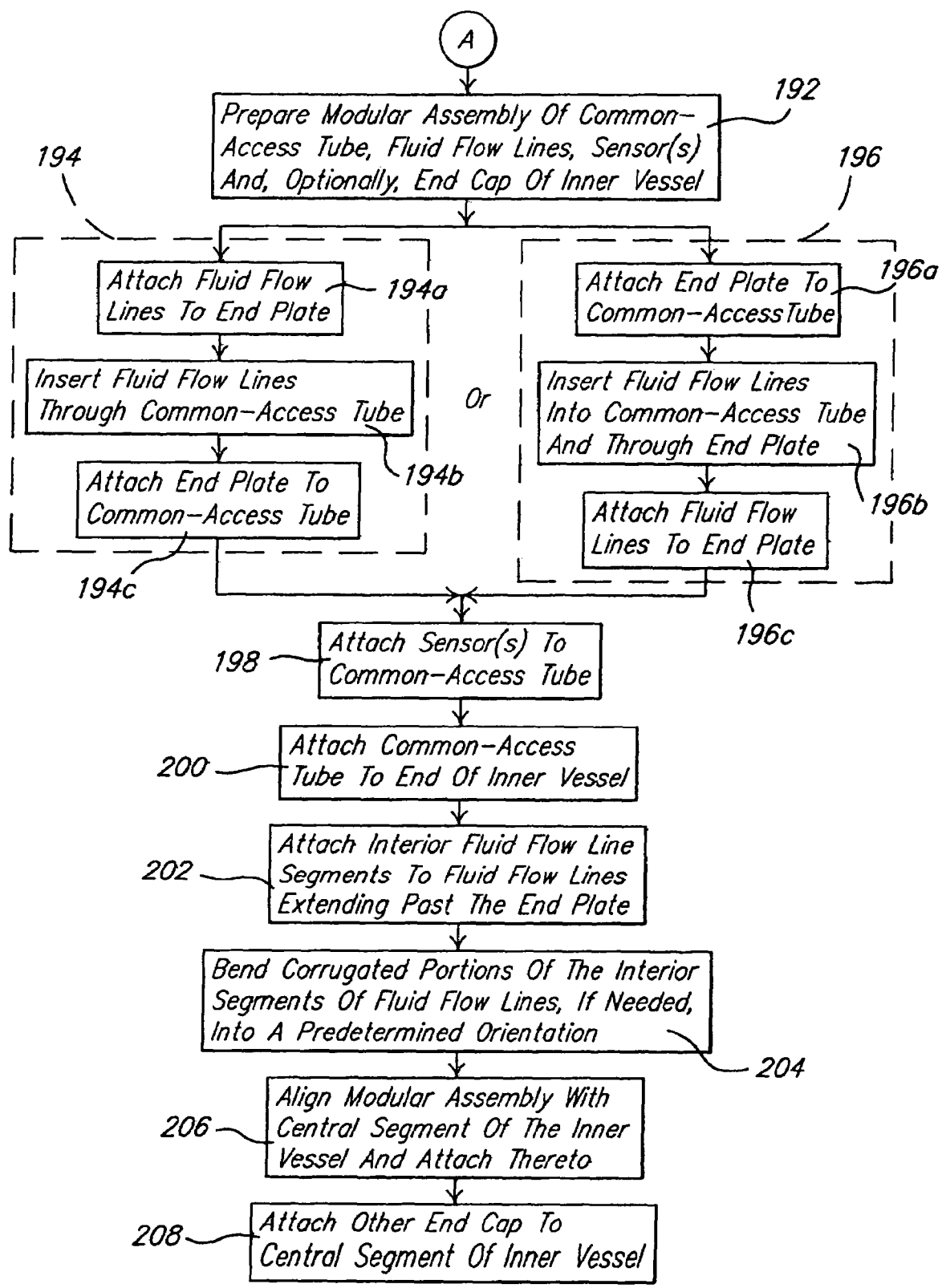

Referring now to the flow charts of FIGS. 14-17, the method of assembling storage tank 20 is shown. Storage tank 20 is formed by assembling inner vessel 22 and fluid flow lines 26 that extend into interior 46 of inner vessel 22, as indicated in block 190. The assembling of inner vessel 22 is shown in FIG. 15. To assemble inner vessel 22, a modular assembly of common-access tube 28, fluid flow lines 26, sensor(s) and, optionally, end cap 42 is formed, as indicated in block 192. There are two main ways to form this modular assembly, as shown in blocks 194 and 196. Either method shown in block 194 or 196 can be utilized.

The methods shown in block 194 are discussed first. In this method of preparing the modular assembly, the fluid flow lines 26 are first attached to end plate 148, as indicated in block 194*a*. To accomplish this, a portion of each fluid flow line 26 is inserted through one of the openings in end plate 148 so that it protrudes out the opposite side. The fluid flow line is welded with welds W, as shown in FIG. 7B, to end plate 148 to form a fluid-tight seal therebetween. The fluid flow lines 26 can each be individually inserted through its associated opening and welded in place with welds W or, alternatively, all the fluid flow lines can be inserted and then subsequently welded with welds W one at a time. The spacing between the fluid flow lines 26 on end plate 148, as shown in FIG. 7B, prevents the fluid flow lines from interfering with each other during the welding process. If the fluid flow lines have not been pre-bent into a desired orientation, the fluid flow lines can then be bent into the proper orientation for subsequent running of the fluid flow lines through common-access tube 28. To accomplish this, the corrugated portions 170 of the fluid flow lines can be bent so that the fluid flow lines will match the flared portion 146 and uniform diameter portion 144 of common-access tube 28. With the fluid flow lines attached to end plate 148 and arranged into the desired orientation, the fluid flow lines are inserted through common-access tube 28 from the second end 142, as indicated in block 194*b*. The free ends of fluid flow lines 26 are inserted through the opening(s) in end plate 150 on first end 140 of common-access tube 28, if so equipped. End plate 148 is aligned with second end 142 and attached to common-access tube 28 by welding, as shown in FIG. 7B and as indicated in block 194*c*. Optionally, the fluid flow lines 26 can also be secured to end plate 150, if so equipped. Thus, one way to attach fluid flow lines 26 to common-access tube 28 can be done by following the procedures indicated in block 194.

Alternately, the fluid flow lines 26 can be attached to common-access tube 28 by following the procedures shown in block 196. To start, end plate 148 is aligned with second end 142 of common-access tube 28 and attached thereto, such as by welding, as shown in FIG. 7B and as indicated in block 196*a*. Next, fluid flow lines 26 are inserted into common-access tube 28 and through the openings in end plate 148, as indicated in block 196*b*. Depending upon the construction, the procedures in blocks 196*b* and 196*a* may be reversed. For example, if common-access tube 28 has a flared portion 146, fluid flow lines 26 are first bent into a desired configuration and, inserted into common-access tube 28 and end plate 148 is then slid over fluid flow lines 26 and welded to second end 142 of common-access tube 28. Each fluid flow line 26 can then be welded to end plate 148, as shown in FIG. 7B and as indicated in block 196*c*. If, however, the common-access tube has a uniform diameter throughout, fluid flow lines 26 can be inserted through common-access tube 28 and through the openings in end plate 148 (already welded to the common-access tube) and: then welded thereto, as shown in FIG. 7B and as indicated in block 196*c*. End plate 150, if desired, can then be positioned in the first end 140 of common-access tube 28 and attached thereto. The fluid flow lines 26 can also be secured to end plate 150. Thus, by following the procedures in block 196, a second way of assembling common-access tube 28 with fluid flow lines 26 can be achieved.

Regardless of the manner in which fluid flow lines 26 are attached to common-access tube 28, the modular assembly is continued to be assembled by attaching sensor(s), such as level sensor 152, to the exterior of common-access tube 28, as indicated in block 198. Once all these sensors are attached to common-access tube 28, the common-access tube is attached to end cap 42 of inner vessel 22, as indicated in block 200. To accomplish this, first end 140 of common-access tube 28 is aligned with a central axial opening in end cap 42 with portions of fluid flow lines 26 extending through the opening in end cap 42 and through bracket 48 (if already attached). First end 140 is then welded to end cap 42 with common-access tube 28 at a desired angle relative to the axial axis of inner vessel 22. Preferably, fluid flow lines 26 extend a substantial distance beyond end cap 42 and past bracket 48 thereon, as shown in FIG. 7A. Next, the interior segments 160*a*, 162*a*, 164*a* are attached to the middle segments 160*b*, 162*b*, 164*b* of fluid flow lines 26, as indicated in block 202 by welds W. The interior segments can be provided as pre-bent segments or as straight segments including both corrugated and non-corrugated portions. With the former, the appropriate end of each interior segment is aligned with the associated middle segment, positioned in desired orientation, and welded thereto. This is repeated for each of the interior segments. With the latter construction, the appropriate end of each interior segment is aligned with the associated middle segment and welded thereto. Once the interior segments are attached to the middle segments, each interior segment can then be bent into the desired configuration by bending the corrugated portions of each interior segment, as indicated in block 204.

With the interior and middle segments of each fluid flow line secured to common-access tube 28, the communication or signal lines for the various sensors that are to be disposed within interior 46 of inner vessel 22 can be routed through one of the fluid flow lines. It should be appreciated that the manufacturing steps performed in blocks 200 and 202 can be reversed in sequence, depending upon the desired order of construction. Regardless of the sequence in which the manufacturing of the modular assembly is conducted, a modular assembly that includes both the interior and middle segments of fluid flow lines 26, common-access tube 28, the internal sensors and end cap 42 are assembled together into a modular assembly and can be used to form inner vessel 22. Specifically, the modular assembly is aligned with central segment 40 of inner vessel 22 and then attached thereto, such as by welding, as indicated in block 206. Alignment of the modular assembly with central segment 40 can be performed by the use of jigs or other suspension mechanisms (not shown) to support and position the modular assembly in alignment with central segment 40 so that the welding of end cap 42 to central segment 40 is facilitated. If not already done, end cap 44 is aligned with central segment 40 and attached thereto, such as by welding, as indicated in block 208. With these procedures complete, the assembly of inner vessel 22 is completed.

Referring back to FIG. 14, once inner vessel 22 is assembled, the next step in preparing storage tank 20 is the application of insulation layers 30 to inner vessel 22, as indicated in block 210. To accomplish this, inner vessel 22 can be positioned on a jig or other support structure (not shown. The insulation layers 30 are then wrapped, preferably in a tangential direction, around central segment 40 and end caps 42, 44. The application of the insulation layers can be manual or automated. The insulation layers are folded over end caps 42, 44 and around the obstructions formed by bracket 48 and tensioning mechanism 50. With all of the fluid flow lines 26 and signal lines for the various sensors within inner vessel 22 exiting inner vessel 22 through common-access tube 28, the number of obstructions to accommodate are reduced and automated application of insulation layers 30 is facilitated. Once the insulation has been applied to inner vessel 22, the next stage in the assembly of storage tank 20 is the suspending of inner vessel 22 within central segment 60 of outer vessel 24, as indicated in block 212.

Referring to FIG. 16, a procedure to suspend inner vessel 22 within central segment 60 of outer vessel 24 is shown. Inner vessel 22 is positioned within central segment 60 of outer vessel 24, as indicated in block 214. A jig or other support structure (not shown) can be used to support inner vessel 22 when it is within central segment 60 prior to being suspended by suspension members 80. With inner vessel 22 in position, first group 82 of suspension members 80 are attached to rollers 88 coupled to an associated stiffening member 68 and to rollers 94 on bracket 48 on end cap 42, as indicated in block 216. To accomplish this, each roller 88 is inserted into the loop formed by a suspension member 80 and attached to its associated bracket 90 on stiffening member 68. Similarly, each roller 94 is also inserted into an associated loop of a suspension member 80 and then attached to its associated bracket 48 on end cap 42 of inner vessel 22. The fixed length of the suspension member loops secure end 42 of inner vessel 22 within one end portion 70 of central segment 60.

Next, second group 84 of suspension members 80 are attached to the rollers 88 coupled to the associated stiffening member 68 and to also to rollers 100 on tensioning mechanism 50, as indicated in block 218. Again, this is accomplished by disposing each roller 88 within one of the suspension member loops 80 and attaching it to its associated bracket 90 on stiffening member 68. Similarly, each roller 100 is also disposed within one of the suspension member loops 80 and attached to bracket member 115. The fixed length of each suspension member loop 80 allows end 44 of inner vessel 22 to be suspended: within the other end portion 70 of central segment 60 of outer vessel 24. The jig or mechanism holding inner vessel 22 within outer vessel, 24 can then be removed and inner vessel 22 suspended within central segment 60 by first and second groups 82, 84 of suspension members 80. It should be appreciated that the procedures indicated in blocks 216 and 218 can be done in the opposite order, if, desired.

With inner vessel 22 suspended within outer vessel 24 by suspension members 80, tensioning mechanism 50 is then adjusted to apply a desired preloading or predetermined tension in suspension members 80, as indicated in block 220. To accomplish this, adjusting member 116 is rotated to cause movable plate 112 to move relative to base plate 110. Movement of movable plate 112 relative to base plate 110 should cause the tension in each suspension member of both first and second groups 82, 84 to change. That is, because the suspension members extend both axially and radially relative to their associated connection to the ends 42, 44 of inner vessel 22, each suspension member imparts an axial and radial suspending force on the associated end of inner vessel 22. Thus, when tensioning mechanism 50 is adjusted, the level of tension in each suspension member 80 should change. The radial suspension forces of suspension members 80 constrain the movement of inner vessel 22 within outer vessel 24 in two directions, while the axial suspending force allows for limited movement in a third (axial) direction. Thus, inner vessel 22 is suspended within central segment 60 of outer vessel 24 with stiffening members 68 supporting end portions 70 of central segment 60 and limiting the deformation thereof due to the suspension of inner vessel 22 therein.

Figure 17:
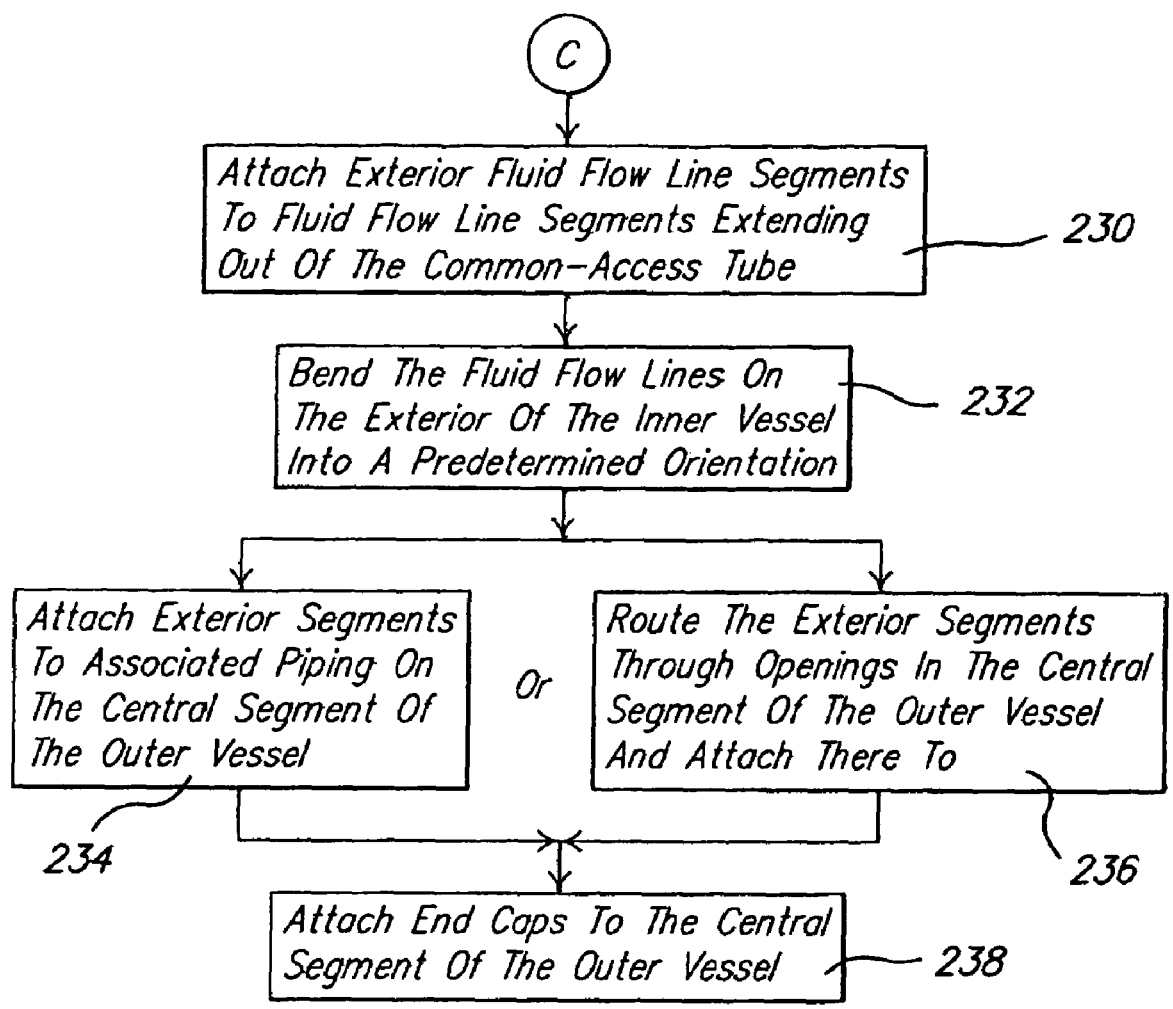

Referring back to FIG. 14, another stage of manufacturing storage tanks 20 is the assembly of outer vessel 24, as indicated in block 224. The assembly procedure of outer vessel 24 is shown in FIG. 17. Once inner vessel 22 is suspended within central segment 60, the exterior segments of fluid flow lines 26 can be attached to the portion of the middle segments that extend out of common-access tube 28 with welds W, as indicated in block 230. Preferably, the middle segments extend beyond inner vessel 22 a distance sufficient to allow the welding of the exterior segments onto the middle segments without damaging or endangering insulation layers 30. Once each exterior segment is welded to its associated middle segment, the portion of the middle segment extending out of common-access tube 28 and the exterior segments attached thereto can be bent into a predetermined orientation, as indicated in block 232. The bending is facilitated by the existence of a variety of corrugated portions 170 and non-corrugated portions 172 in each of the segments of the fluid flow lines. For example, as shown in FIGS. 8 and 9, the middle segments 160b, 162b, 164b would extend outwardly beyond the common-access tube 28 and can be bent upwardly to provide a desired rise in elevation of these associated fluid flow lines 26.

The exterior segments 160c, 162c, 164c could also be bent at their various corrugated portions 170 to provide a desired orientation, such as that shown in FIGS. 8 and 9.

The exterior segments 160c, 162c, 164c are routed to communicate with the exterior of outer vessel 24 by one of two ways, as indicated in blocks 234 and 236. One method is to attach exterior segments 160c, 162c, 164c to associated piping (not shown) that extends into the interior of central segment 60 of outer vessel 24, as indicated in block 234. The piping can extend beyond end portion 70 so that the exterior segments of each fluid flow line 26 can be easily welded thereto without jeopardizing the integrity of insulation layers 30. Alternately, as indicated in block 236, the exterior segments 160c, 162c, 164c can be routed through openings (not shown) in central segment 60 of outer vessel 24 and subsequently attached thereto, such as by welding. If desired, the various fluid flow lines can be mixed or matched between the two possibilities disclosed in blocks 234 and 236. Due to the use of non-corrugated portions 172 between corrugated portions 170, the stiffness of exterior segments 160c, 162c, 164c should be sufficient to provide support for the fluid flow lines without requiring additional support or connection points/brackets.

Regardless of how the exterior segments 160c, 162c, 164c are secured, the next step is to attach end caps 62, 64 to outer vessel 24, as indicated in block 238. To accomplish this, end caps 62, 64 are placed in alignment with end portions 70 of central segment 60. Portions of stiffening members 68 extend beyond end portions 70 and will extend into end-caps 62, 64, as shown in FIGS. 1 and 4. End caps 62, 64 are then welded to central segment 60 with weld W. The overlapping of stiffening members 68 across the juncture of end portions 70 of central segment 60 with end caps 62, 64 inhibits the entry of sparks and other debris from the welding process into the space between inner and outer vessels 22, 24 and onto the insulation layers 30 therein.

With outer vessel 24 assembled, a vacuum is formed between inner and outer vessels 22 and 24, as indicated in block 240. The assembly of cryogenic storage tank 20 is now complete. The attachment of end caps 62, 64 to central segment 60 provides further support for central segment 60 against the load imparted by the suspension of inner vessel 22 therein. Due to the support of stiffening members 68 on central segment 60, the alignment of end caps 62, 64 with central segment 60 is facilitated because of the limited deformation of end portions 70 as a result of suspending inner vessel 22 therein.

While the present invention has been described with reference to specific configurations and procedures for forming the cryogenic storage tank, it should be appreciated that variations can be employed without departing from this spirit and scope of the present invention. For example, each fluid flow line could include discrete segments having both corrugated and non-corrugated portions and discrete segments that are free of corrugated portions. Additionally, the various segments may include pre-bent segments and segments having corrugated and non-corrugated portions. Additionally, some segments could be pre-bent in some areas and have corrugated portions for subsequent bending during the assembly of storage tank 20. Moreover, the length of the various segments can vary and, in some cases, one or more of the fluid flow lines can be a single unitary uninterrupted flow line. Additionally, the orientation of the fluid flow lines 26 is shown for one particular construction of a storage tank 20. It should be appreciated that other final orientations for the fluid flow lines 26 can be employed, as necessitated by the design of storage tank 20, without departing from the scope of the present invention. Moreover, it should be appreciated that common-access tube 28 could extend through a non-axial centered portion of an end-cap of inner vessel 22, if desired, although all the benefits of the present invention may not be realized. Additionally, while the modular assembly is discussed as including specific components, it should be appreciated that additional components or less components can be assembled into a modular pre-assembly and then used to form various portions of storage tank 20. As such, the construction of the present invention facilitates the preparation of various modular components that can be made in one location and, if desired, moved to a second location for assembly into the remaining components to form storage tank 20. Thus, the above description of the invention is merely exemplary in nature, and variations that do not depart from the gist of the invention are intended to within the scope of the invention. As such, such variations are not to be regarded as a departure from the spirit and scope of the invention.

What is claimed is:

1. A cryogenic storage tank comprising:
    a fluid-tight outer vessel;
    a fluid-tight inner vessel located within the outer vessel;
    a vacuum between the outer vessel and the inner vessel;
    a plurality of fluid flow lines extending from an exterior of the inner vessel into and communicating with an interior of the inner vessel; and
    a tube extending into and being sealed from the interior of the inner vessel and communicating with the exterior of the inner vessel,
    wherein at least two of the fluid flow lines extend into the interior of the inner vessel through the tube, the tube extends into the interior of the inner vessel greater than a majority of an axial length of the inner vessel, and the tube includes a generally cylindrical section that extends into the interior of the inner vessel and a radially expanding section adjacent to the cylindrical section and disposed in the interior of the inner vessel.

2. The cryogenic storage tank of claim 1, wherein the at least two fluid flow lines extend into the interior of the inner vessel through an end wall of the tube.

3. The cryogenic storage tank of claim 1, wherein the at least two fluid flow lines are at least two of a gas extraction line, a liquid refueling line, a heat exchange loop and a liquid extraction line.

4. The cryogenic storage tank of claim 1, wherein the tube slopes downwardly as the tube extends into the interior of the inner vessel.

5. The cryogenic storage tank of claim 1, wherein a substantial majority of the tube is straight.

6. The cryogenic storage tank of claim 1, wherein the tube extends through an axial center portion of an end wall of the inner vessel.

7. The cryogenic storage tank of claim 1, wherein the vacuum between the inner and outer vessels is also in the tube.

8. The cryogenic storage tank of claim 1, wherein the at least two fluid flow lines are spaced apart from a side wall of the tube.

9. The cryogenic storage tank of claim 1, wherein the at least two fluid flow lines are spaced apart from one another in the tube.

10. The cryogenic storage tank of claim 1, wherein the at least two fluid flow lines are in direct contact with one another within the tube.

11. The cryogenic storage tank of claim 1, wherein the at least two fluid flow lines extend upwardly upon exiting from the tube on the exterior of the inner vessel.

12. The cryogenic storage tank of claim 1, further comprising a plurality of insulation layers between the inner and outer vessels.

13. The cryogenic storage tank of claim 1, wherein all fluid flow lines and instrumentation lines enter the interior the inner vessel through the tube.

14. A cryogenic storage tank comprising:
    a fluid-tight outer vessel;
    a fluid-tight inner vessel disposed within the outer vessel in a spaced relation therefrom, the inner vessel having a central segment and axially opposite end segments that define an interior of the inner vessel, the interior operable to store a fluid therein;
    a vacuum between the inner and outer vessels;
    at least one insulation layer between the inner and outer vessels;
    a conduit which is a separate component from the inner vessel and is attached to an axial center portion of one of the end segments, the conduit having opposite first and second ends, the first end being fluid tight and disposed in the interior of the inner vessel, the second end communicating with the vacuum between the inner and outer vessel and extending outwardly beyond an exterior of the inner vessel; and
    a plurality of fluid lines extending between the interior of the inner vessel and an exterior of the inner vessel through the conduit,
    wherein the tube includes a generally cylindrical section that extends into the interior of the inner vessel and a radially expanding section adjacent to the cylindrical section and disposed in the interior of the inner vessel.

15. The cryogenic storage tank of claim 14, wherein each of the fluid lines is welded to the first end of the conduit.

16. The cryogenic storage tank of claim 14, wherein the plurality of fluid lines includes a liquid fill line and a gas extraction line.

17. The cryogenic storage tank of claim 14, wherein the conduit and the portions of the fluid lines within the conduit extend downwardly as the conduit extends within the interior of the inner tank toward the first end.

18. The cryogenic storage tank of claim 14, wherein the second end of the conduit is aligned with an axial center position of one of the end segments of the inner vessel.

19. The cryogenic storage tank of claim 1, wherein the tube has opposite first and second ends, the first end being fluid tight and disposed in the interior of the inner vessel, the second end communicating with a vacuum between the inner and outer vessels and extending outwardly beyond an exterior of the inner vessel.

20. The cryogenic storage tank of claim 19, wherein the tube is a separate component from the inner vessel and is attached to an axial center portion of an end segment of the inner vessel.

* * * * *